(12) United States Patent
Samuel et al.

(10) Patent No.: US 9,261,626 B2
(45) Date of Patent: Feb. 16, 2016

(54) CONTACT LENSES WITH ENZYMATICALLY DEGRADABLE COATINGS THEREON

(71) Applicant: Novartis AG, Basel (CH)

(72) Inventors: Newton T. Samuel, Suwanee, GA (US);
Nirupama Kenkare, Alpharetta, GA (US)

(73) Assignee: Novartis AG, Basel (CH)

( * ) Notice: Subject to any disclaimer, the term of this patent is extended or adjusted under 35 U.S.C. 154(b) by 369 days.

(21) Appl. No.: 13/706,737

(22) Filed: Dec. 6, 2012

(65) Prior Publication Data

US 2013/0148077 A1    Jun. 13, 2013

Related U.S. Application Data

(60) Provisional application No. 61/568,232, filed on Dec. 8, 2011.

(51) Int. Cl.
*G02B 1/04* (2006.01)

(52) U.S. Cl.
CPC ..................... *G02B 1/043* (2013.01)

(58) Field of Classification Search
None
See application file for complete search history.

(56) References Cited

U.S. PATENT DOCUMENTS

| | | |
|---|---|---|
| 3,408,429 A | 10/1968 | Wichterle |
| 4,347,198 A | 8/1982 | Ohkada |
| 4,444,711 A | 4/1984 | Schad |
| 4,460,534 A | 7/1984 | Boehm |
| 5,159,360 A | 10/1992 | Stoy |
| 5,461,433 A | 10/1995 | Nakabayashi |
| 5,508,317 A | 4/1996 | Müller |
| 5,583,163 A | 12/1996 | Müller |
| 5,760,100 A | 6/1998 | Nicolson |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger |
| 6,218,508 B1 | 4/2001 | Kragh |
| 6,627,124 B1 | 9/2003 | Herbrechtsmeier |
| 6,800,225 B1 | 10/2004 | Hagmann |
| 7,384,590 B2 | 6/2008 | Kelly |
| 7,387,759 B2 | 6/2008 | Kelly |
| 7,429,558 B2 | 9/2008 | Batchelor |
| 2004/0116564 A1 | 6/2004 | Devlin |
| 2004/0140578 A1 | 7/2004 | Kelly |
| 2005/0060812 A1 | 3/2005 | Batchelor |
| 2011/0102736 A1 | 5/2011 | Wu |

FOREIGN PATENT DOCUMENTS

| | | | |
|---|---|---|---|
| WO | 9828026 | A1 | 7/1998 |
| WO | WO 2008144247 | * | 11/2008 |
| WO | 2011071791 | A1 | 6/2011 |

OTHER PUBLICATIONS

Authors: H. Yasuda Article: Glow Discharge Polymerization Published: Journal of Polymer Science: Macromolecular Reviews, vol. 16, 199-293 (1981).
Authors: J. Mort and F. Jansen Article: Plasma Deposited Thin films Published: CRC Press Boca Raton, pp. 1-19.
Authors: N. Dilsiz and G. Akovali Article: Plasma polymerization of selected organic compounds Published: Polymer, vol. 37 (1996) pp. 333-341.
Authors: L. Winterton, J. White, Kai C. Su Article: Coulometric Method for measuring Oxygen Flux and Dk of Contact Lenses and Lens Material Published: The Cornea: Transactions of the World Congress on the Cornea 111, Raven Press: New York 1988: pp. 273-280.
Authors: Myrra G. Carstens, Cornelus F. van Nostrum, Ruud Verrik, Leo G.J. Deleede, Daan J.A. Crommelin, Wim E. Hennink; Article: A Mechanistic Study on the Chemical and Enzymatic Degradation of PEG-oligolo (e-caprolactive) Michelles Published: Journal of Pharmaceutical Sciences, vol. 97, No. 1, Jan. 1, 2008.
PCT International Search Report dated Jun. 5, 2013, International Application No. PCT/US2012/068146, International Filing Date Dec. 6, 2012.
PCT Written Opinion of the International Searching Authority dated Jun. 5, 2013, International Application No. PCT/US2012/068146, International Filing Date Dec. 6, 2012.

* cited by examiner

*Primary Examiner* — Tigabu Kassa
(74) *Attorney, Agent, or Firm* — Jian Zhou

(57) ABSTRACT

The invention is related to a disposable contact lens comprising a top coating which is made of a hydrophilic polymeric material including dangling hydrophilic polymer chains covalently linked to the hydrophilic polymeric material through oligo-caprolactone linkages susceptible to enzymatic degradation in the eyes. The top coating is stable to lens processing/storage and confers lubricity to the lens. However, it slowly is degraded during the lens wear due to the action of enzymes (e.g., Lipase) in tear film. The loss in lubricity will be experienced as a drop in comfort for the lens wearer and thereby serves as the built-in compliance features of the disposable contact lens.

14 Claims, No Drawings

CONTACT LENSES WITH ENZYMATICALLY DEGRADABLE COATINGS THEREON

This application claims the benefits under 35 USC §119 (e) of U.S. provisional application No. 61/568,232 filed 8 Dec. 2011, incorporated by reference in their entireties.

The present invention generally relates to a cost-effective and time-efficient method for applying a crosslinked hydrophilic coating onto a silicone hydrogel contact lens to improve its hydrophilicity and lubricity. In addition, the present invention provides an ophthalmic lens product.

BACKGROUND

Today, the most common type of contact lenses is disposables. Disposable contact lenses generally refer to those contact lenses needed to be discarded on the replacement date set by the manufacturer. Current compliance dates (or replacement schedules) are daily disposables, 1-2 week disposables and 1-3 month disposables and are approved by the U.S. Food and Drug Administration (FDA). The preference for disposable contact lenses by eye care practitioners and patients is largely due to their health and convenience benefits. However, non-compliance with recommended replacement schedule may cause complications including deposits, mild wearing discomfort, and vision-threatening adverse events. Therefore, it would be desirable to make disposable contact lenses with build-in features that would force compliance with the replacement schedules.

SUMMARY OF THE INVENTION

The invention, in one aspect, provides a disposable contact lens, in particular a disposable silicone hydrogel contact lens, which comprise a preformed contact lens composed of a non-silicone hydrogel material (preferably a silicone hydrogel material), and a top lubricious hydrophilic coating thereon, wherein the top lubricious hydrophilic coating comprises dangling hydrophilic polymer chains covalently attached directly or indirectly onto the preformed contact lens through one or more oligo-caprolactone linkages susceptible to cleavage by enzymes present in tear fluid, wherein the disposable contact lens is characterized by having a controlled, wearing-induced deterioration in surface hydrophilicity and/or lubricity over a replacement schedule period.

This and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

A "silicone hydrogel contact lens" refers to a contact lens comprising a silicone hydrogel material.

A "hydrogel" refers to a crosslinked polymeric material which is not water-soluble and can contains at least 10% by weight of water within its polymer matrix when fully hydrated.

A "non-silicone hydrogel" refers to a hydrogel that is free of silicone.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl methacryloyl

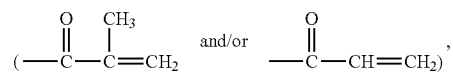

allyl, vinyl

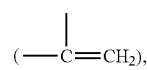

styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a medium and high molecular weight compound or polymer that contains ethylenically unsaturated groups. Medium and high molecular weight typically means average molecular weights greater than 700 Daltons.

A "polymer" means a material formed by polymerizing/crosslinking one or more monomers or macromers or prepolymers.

"Molecular weight" of a polymeric material (including monomeric or macromeric materials), as used herein, refers to the weight-average molecular weight unless otherwise specifically noted or unless testing conditions indicate otherwise.

The term "amino group" refers to a primary or secondary amino group of formula —NHR', where R' is hydrogen or a $C_1$-$C_{20}$ unsubstituted or substituted, linear or branched alkyl group, unless otherwise specifically noted.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of amine groups of the polyamine or polyamidoamine into azetidinium groups.

An "azetidinium group" refers to a positively charged group of

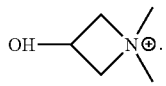

The term "phosphorylcholine" refers to a zwitterionic group of

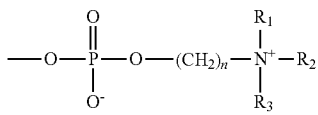

in which n is an integer of 1 to 5 and $R_1$, $R_2$ and $R_3$ independently of each other are $C_1$-$C_8$ alkyl or $C_1$-$C_8$ hydroxyalkyl.

The term "water-soluble" in reference to a polymer or polymeric material means that the polymer or polymeric material can be dissolved in water to an extent sufficient to form an aqueous solution having a concentration of up to about 30% by weight at room temperature (defined above).

A "water contact angle" refers to an average water contact angle (i.e., contact angles measured by Sessile Drop method), which is obtained by averaging measurements of contact angles with at least 3 measurements.

An "oligo-caprolactone linkage" refers to a divalent linkage comprising a divalent radical of

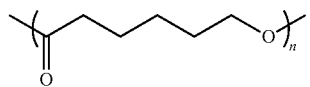

in which n is an integer of 12 or less, preferably 2 to 10, more preferably 2 to 8, even more preferably 2 to 6.

A "reactive oligo-caprolactone group" refers to a monovalent radical of formula (I)

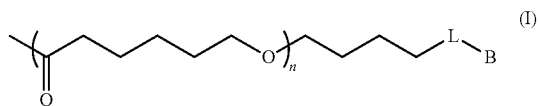

in which in which "n" is an integer of 12 or less (preferably 2 to 10, more preferably 2 to 8, even more preferably 2 to 6), L is a direct bond or a divalent radical having up to 24 carbon atoms and optionally containing one or more linkages selected from the group consisting of —C(O)—, —O—, —NR'— (R' as defined above), —S—, or combination thereof, and B is amino group (—NHR' as defined above) or carboxyl group or thiol group (preferably amino or carboxyl group).

The term "controlled, wearing-induced deterioration in surface hydrophilicity and/or lubricity over a replacement schedule period" in reference to a disposable contact lens means that the surface hydrophilicity and/or lubricity of the contact lens decrease significantly after being worn for a scheduled replacement period (e.g., one day, one week, two weeks, one month).

A "crosslinked hydrophilic polymeric coating" as used in this application means a layer of a crosslinked polymeric material having a three-dimensional network that can contain water when fully hydrated. The three-dimensional network of a crosslinked polymeric material can be formed by crosslinking of two or more linear or branched polymers through crosslinkages.

A "coupling reaction" is intended to describe any reaction between a pair of matching functional groups in the presence or absence of a coupling agent to form covalent bonds or linkages under various reaction conditions well known to a person skilled in the art, such as, for example, oxidation-reduction conditions, dehydration condensation conditions, addition conditions, substitution (or displacement) conditions, Diels-Alder reaction conditions, cationic crosslinking conditions, ring-opening conditions, epoxy hardening conditions, and combinations thereof. Non-limiting examples of coupling reactions under various reaction conditions between a pair of matching co-reactive functional groups selected from the group preferably consisting of amino group (—NHR' as defined above), hydroxyl group, carboxylic acid group, acid halide groups (—COX, X=Cl, Br, or I), acid anhydrate group, aldehyde group, azlactone group, isocyanate group, epoxy group, aziridine group, thiol group, and amide groups (—CONH$_2$), are given below for illustrative purposes. A carboxylic acid group reacts with an amino group —NHR' in the presence of a coupling agent—carbodiimide (e.g., 1-ethyl-3-(3-dimethylaminopropyl) carbodiimide (EDC), N,N'-dicyclohexylcarbodiimide (DCC), 1-cyclohexyl-3-(2-morpholinoethyl)carbodiimide, diisopropyl carbodiimide, or mixtures thereof) to form an amide linkage; a carboxylic acid group reacts with an isocyanate group under heating to form an amide linkage; a carboxyl group reacts with an epoxy or aziridine group to form an ester bond; a carboxyl group reacts with a halide group (—Cl, —Br or —I) to form an ester bond; an amino group reacts with aldehyde group to form a Schiff base which may further be reduced; an amino group —NHR' reacts with an acid chloride or bromide group or with an acid anhydride group to form an amide linkage (—CO—NR'—); an amino group —NHR' reacts with an isocyanate group to form a urea linkage (—NR'—C(O)—NH—); an amino group —NHR' reacts with an epoxy or aziridine group to form an amine bond (C—NR'); an amino group reacts (ring-opening) with an azlactone group to form a linkage (—C(O)NH—CR$_1$R$_2$—(CH$_2$)$_r$—C(O)—NR'—); an amino group reacts with a halide group (—Cl, —Br or —I) to form an amine bond; a hydroxyl reacts with an isocyanate to form a urethane linkage; a hydroxyl reacts with an epoxy or aziridine or a halide group (—Cl, —Br or —I) to form an ether linkage (—O—); a hydroxyl reacts with an acid chloride or bromide group or with an acid anhydride group to form an ester linkage; an hydroxyl group reacts with an azlactone group in the presence of a catalyst to form a linkage (—C(O)NH—CR$_1$R$_2$—(CH$_2$)$_r$—C(O)—O—); a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thiolester linkage; a thiol group group reacts with an azlactone group in the presence of a catalyst to form a linkage (—C(O)NH-alkylene-C(O)—S—); a thiol group reacts with a vinyl group based on thiol-ene reaction under thiol-ene reaction conditions to form a thioether linkage (—S—); and a thiol group reacts with an acryloyl or methacryloyl group based on Michael Addition under appropriate reaction conditions to form a thioether linkage; a positively-charged azetidinium group reacts, at a relatively elevated temperature (from about 40° C. to about 140° C.), with a functional group such as amino group, thiol group or carboxylate —COO⁻ (i.e., the deprotonated form of a carboxyl group) to form neutral, hydroxyl-containing covalent linkages according to Scheme I

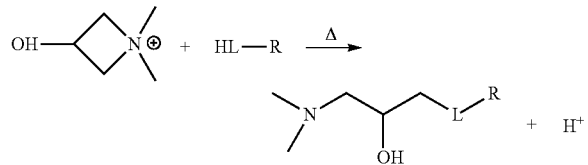

Scheme I in which R is the rest portion of a compound, L is —NR'—, —S— or —OC(=O)—, R' is hydrogen, a C$_1$-C$_{20}$ unsubstituted or substituted, linear or branched alkyl group or a polymer chain.

It is also understood that coupling agents with two reactive functional groups may be used in the coupling reactions. A coupling agent having two reactive functional groups can be a diisocyanate, a di-acid halide, a di-carboxylic acid compound, a di-acid halide compound, a di-azlactone compound, a di-epoxy compound, a diamine, or a diol. A person skilled in the art knows well to select a coupling reaction (e.g., anyone described above in this application) and conditions thereof to prepare a polysiloxane terminated with one or more ethylenically unsaturated groups. For example, a diisocyanate, di-acid halide, di-carboxylic acid, di-azlactone, or di-epoxy compound can be used in the coupling of two hydroxyl, two amino groups, two carboxyl groups, two epoxy groups, or combination thereof; a diamine or dihydroxyl compound can be used in the coupling of two isocyanate, epoxy, aziridine, carboxylic acid, acid halide or azlactone groups or combinations thereof.

Any suitable C$_4$-C$_{24}$ diisocyanates can be used in the invention. Examples of preferred diisocyanates include without limitation isophorone diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl)cyclohexane, cyclohexane diisocyanate, and combinations thereof.

Any suitable diamines can be used in the invention. An organic diamine can be a linear or branched C$_2$-C$_{24}$ aliphatic diamine, a C$_5$-C$_{24}$ cycloaliphatic or aliphatic-cycloaliphatic diamine, or a C$_6$-C$_{24}$ aromatic or alkyl-aromatic diamine. A preferred organic diamine is N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, and isophorone diamine.

Any suitable diacid halides can be used in the invention. Examples of preferred diacid halide include without limitations fumaryl chloride, suberoyl chloride, succinyl chloride, phthaloyl chloride, isophthaloyl chloride, terephthaloyl chloride, sebacoyl chloride, adipoyl chloride, trimethyladipoyl chloride, azelaoyl chloride, dodecanedioic acid chloride, succinic chloride, glutaric chloride, oxalyl chloride, dimer acid chloride, and combinations thereof.

Any suitable di-epoxy compounds can be used in the invention. Examples of preferred di-epoxy compounds are neopentyl glycol diglycidyl ether, 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, and combinations thereof. Such di-epoxy compounds are available commercially (e.g., those DENACOL series di-epoxy compounds from Nagase ChemteX Corporation).

Any suitable C$_2$-C$_{24}$ diols (i.e., compounds with two hydroxyl groups) can be used in the invention. Examples of preferred diols include without limitation ethylene glycol, diethylene glycol, triethylene glycol, tetraethylene glycol, polyethylene glycol, propylene glycol, 1,4-butanediol, various pentanediols, various hexanediols, various cyclohexanediols, and combination thereof.

Any suitable C$_3$-C$_{24}$ di-carboxylic acid compounds can be used in the invention. Examples of preferred di-carboxylic acid compounds include without limitation a linear or branched C$_3$-C$_{24}$ aliphatic dicarboxylic acid, a C$_5$-C$_{24}$ cycloaliphatic or aliphatic-cycloaliphatic dicarboxylic acid, a C$_6$-C$_{24}$ aromatic or araliphatic dicarboxylic acid, a dicarboxylic acid which contains amino or imido groups or N-heterocyclic rings, and combinations thereof. Examples of suitable aliphatic dicarboxylic acids are: oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable aromatic dicarboxylic acids are: terephthalic acid, isophthalic acid, o-phthalic acid, 1,3-, 1,4-, 2,6- or 2,7-naphthalenedicarboxylic acids, 4,4'-diphenyldicarboxylic acid, 4,4'-diphenylsulphone-dicarboxylic acid, 1,1,3-trimethyl-5-carboxyl-3-(p-carboxyphenyl)-indane, 4,4'-diphenyl ether-dicarboxylic acid, bis-p-(carboxylphenyl)-methane.

Any suitable $C_{10}$-$C_{24}$ di-azlactone compounds can be used in the invention. Examples of such diazlactone compounds are those described in U.S. Pat. No. 4,485,236 (herein incorporated by reference in its entirety).

The reactions conditions for the above described coupling reactions are taught in textbooks and are well known to a person skilled in the art.

The intrinsic "oxygen permeability", Dk, of a material is the rate at which oxygen will pass through a material. In accordance with the invention, the term "oxygen permeability (Dk)" in reference to a hydrogel (silicone or non-silicone) or a contact lens means an oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

The "ion permeability" through a lens correlates with the Ionoflux Diffusion Coefficient. The Ionoflux Diffusion Coefficient, D (in units of $[mm^2/min]$), is determined by applying Fick's law as follows:

$$D = -n'/(A \times dc/dx)$$

where n'=rate of ion transport [mmol/min]; A=area of lens exposed $[mm^2]$; dc=concentration difference [mmol/L]; dx=thickness of lens [mm].

The invention is generally directed to disposable contact lenses, in particular, disposable silicone hydrogel contact lenses, which comprises built-in compliance features, a top coating which is stable to lens processing/storage but undergoes controlled degradation during lens wear by enzymatic degradation of the top coating. The invention is partly based on the discovery that the top coating can be made from hydrophilic polymeric material including dangling hydrophilic polymer chains covalently linked to the hydrophilic polymeric material through oligo-caprolactone linkages. The top coating confers lubricity to the lens, but slowly is degraded during the lens wear due to the action of enzymes (e.g., Lipase) in tear film. It is believed that enzymes (e.g., Lipase) can cleave the linkages oligo-caprolactone linkages and release (or lose) dangling hydrophilic polymer chains which are primarily responsible for the lubricity. The lens still maintains adequate wettability for the consumer (from the remaining parts of the top coating and/or underlying base coating). The loss in lubricity will be experienced as a drop in comfort for the lens wearer and thereby serves as the build-in compliance features of the disposable contact lens.

The invention, in one aspect, provides a disposable contact lens, in particular a disposable silicone hydrogel contact lens, which comprise a preformed contact lens composed of a non-silicone hydrogel material (preferably a silicone hydrogel material), and a top lubricious hydrophilic coating thereon, wherein the top lubricious hydrophilic coating comprises dangling hydrophilic polymer chains covalently attached directly or indirectly onto the preformed contact lens through one or more oligo-caprolactone linkages (as defined above) susceptible to cleavage by enzymes present in tear fluid, wherein the disposable contact lens is characterized by having a controlled, wearing-induced deterioration in surface hydrophilicity and/or lubricity over a replacement schedule period.

A preformed contact lens (non-silicone or preferably silicone hydrogel contact lens) can be any commercial contact lenses. Alternatively, a preformed contact lens (preferably a silicone hydrogel contact lens) can be made according to any methods well known to a person skilled in the art. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses. For production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

Numerous SiHy lens formulations have been described in numerous patents and patent applications published by the filing date of this application. All of them can be used in obtaining a preformed SiHy lens which in turn becomes the inner layer of a SiHy contact lens of the invention, so long as they will yield a SiHy material having a Dk and water content specified above. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, filcon II 3, can also be used in making preformed SiHy contact lenses (the inner layer of a SiHy contact lens of the invention).

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In a preferred embodiment, a disposable SiHy contact lens comprises a physically-deposited (PD) base coating on top of the preformed SiHy contact lens but beneath the top coating, wherein the top coating is covalently attached onto the PD base coating. The PD base coating comprises a polymeric coating material comprising reactive functional groups and affinity groups, wherein the reactive functional groups (which can participate in a coupling reaction with the reactive functional groups of a reactive hydrophilic polymeric material in the presence or absence of a coupling agent to form a crosslinked polymeric coating) are selected from the group consisting of carboxyl groups (i.e., —COOH), azetidinium group, amino groups (i.e., primary and/or secondary amino groups), azlactone groups, isocyanate groups, epoxy groups, aziridine groups, thiol groups, hydroxyl groups, and combinations thereof, preferably selected from the group consisting of carboxyl groups, azetidinium groups, amino groups, azlactone groups, isocyanate groups, epoxy groups, aziridine groups, and combinations thereof, more preferably selected from the group consisting of carboxyl groups, azetidinium group, amino groups, epoxy groups, and combinations thereof, even more preferably selected from the group consisting of carboxyl groups, azetidinium group, amino groups, epoxy groups, and combinations thereof, most preferably selected from the group consisting of carboxyl groups, amino groups, and combinations thereof, wherein the affinity groups are either identical to or different from the reactive functional groups and are selected from the group consisting of carboxyl groups, ammonium groups (i.e., acidified primary, secondary or tertiary amino groups), hydrophobic moieties (e.g., C8-C20 alkyl groups), hydrophobic segments (e.g., tris(trialkylsilyloxy)silyl, di(trialkylsilyloxy)silyl, polydimethylsiloxane, polypropylene oxide, polybutylene oxide), and combinations thereof, preferably selected from the group consisting of carboxyl groups, ammonium groups, and combination thereof.

It is understood that the affinity groups of the polymeric coating material for forming the PD base coating are capable of interacting with monomeric units and/or hydrophobic moieties and/or segments of the contact lens (preferably the silicone hydrogel contact lens) at and near the surface of the contact lens so as to bind the polymeric coating material. The affinity groups of a polymeric coating material can be: carboxyl groups if a contact lens to be coated contains monomeric units of an amide-containing vinylic monomer (as described below) or an ammonium-containing vinylic monomer (as described below) (i.e., acidified primary, secondary or tertiary amino groups); ammonium groups if a contact lens to be coated contains monomeric units of a carboxyl-containing vinylic monomer (as described below); hydrophobic moieties or segments if a contact lens to be coated contains silicone components. It is believed that the carboxyl groups of a polymeric coating material can interact with amide-type vinylic monomeric units in the lens material through either ionic/polar interaction or hydrogen bonding to maintain an affinity to the lens material; that the carboxyl groups of a polymeric coating material can interact with ammonium-containing vinylic monomeric units in the lens material through ionic/ionic interactions and hydrogen bonding to maintain an affinity to the lens material; that the ammonium groups of a polymeric coating material can interact with carboxyl-containing vinylic monomeric units in the lens material through either ionic/polar interaction or hydrogen bonding to maintain an affinity to the lens material; and that the hydrophobic moieties or segments of a polymeric coating material can interact with silicone components in the lens material through hydrophobic-hydrophobic interactions to maintain an affinity to the lens material.

Amide-containing vinylic monomers have been widely used in making contact lenses. Preferred examples of amide-type vinylic monomers includes without limitation N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, N-vinyl-2-pyrrolidone (NVP), N-vinyl formamide, N-vinyl acetamide, N-vinyl isopropylamide, N-vinyl-N-methyl acetamide, and mixtures thereof.

An "ammonium group" refers to an acidified primary, secondary or tertiary amino group. Examples of ammonium-containing vinylic monomers include without limitation allylamine, vinylamine, trimethylammonium 2-hydroxy propylmethacrylate, amino-$C_2$-$C_4$ alkyl(meth)acrylate, $C_1$-$C_4$ alkylamino-$C_2$-$C_4$ alkyl(meth)acrylate, vinylamine, amino-$C_2$-$C_4$ alkyl(meth)acrylamide, $C_1$-$C_4$ alkylamino-$C_2$-$C_4$ alkyl(meth)acrylamide, di($C_1$-$C_4$ alkyl)amino-$C_2$-$C_4$ alkyl(meth)acrylate, tri($C_1$-$C_4$ alkyl)amino-$C_2$-$C_4$ alkyl (meth)acrylate, and mixtures thereof.

Examples of carboxyl-containing vinylic monomers include without limitation acrylic acid, a $C_1$-$C_4$ alkylacrylic acid (e.g., methacrylic acid, ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, and combination thereof.

Any polymer or copolymer having above-described reactive functional and affinity groups can be used in the invention so long as it can be dissolved in water, preferably in a mixture of water and at least one organic solvent, more preferably in an organic solvent or a mixture of organic solvents at room temperature in an amount of from about 0.001% to about 1.5%, preferably from about 0.002% to about 1%, more preferably from 0.003% to about 0.5% by weight relative to the total weight of the organic-based coating solution. It is believed that an organic-based solvent can swell a contact lens so that a portion of the polymeric coating material may penetrate into the contact lens and increase the durability of the PD base coating.

Examples of preferred polymeric coating materials includes without limitation: (1) homopolymers of an ammonium-containing vinylic monomer (any one of those described above) or a caboxyl-containing vinylic monomer (any one of those described above); (2) copolymer of one or more ammonium-containing and/or carboxyl-containing vinylic monomers (those described above); (3) copolymer of one or more ammonium-containing and/or carboxyl-containing vinylic monomers (those described above) with a non-reactive vinylic monomer selected from the group consisting of (meth)acrylamide, N,N-dimethyl(meth)acrylamide, N-vinylpyrrolidone (NVP), N,N-dimethylaminoethyl(meth)acrylate, N,N-dimethylaminopropyl(meth)acrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl(meth)acrylate, hydroxypropyl(meth)acrylate, $C_1$-$C_4$-alkoxy polyethylene glycol(meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), a phosphorylcholine-containing vinylic monomer (including (meth)acryloyloxyethyl phosphorylcholine and those described in U.S. Pat. No. 5,461,433, herein incorporated by reference in its entirety), and combinations thereof and optionally with one or more reactive vinylic monomer having a reactive functional group selected from the group consisting of azetidinium group, azlactone groups, isocyanate groups, epoxy groups, aziridine groups, and combinations thereof; (4) polyethyleneimine (PEI); (5) polyvinylalcohol with pendant primary and/or secondary amino groups; (6) block copolymers including at least one hydrophobic segments (preferably selected from the group consisting of polydimethylsiloxane, poly(propylene oxide), poly(butylene oxide), a polymer chain or segment consisting essentially of one or more silicone-containing vinylic monomers (preferably those described below), $C_8$-$C_{16}$ alkyl(meth)acrylate, and/or $C_8$-$C_{16}$ alkyl(meth)acrylamide, and combinations thereof) and polymeric segments having reactive functional groups selected from the group consisting of azetidinium group, azlactone groups, isocyanate groups, epoxy groups, aziridine groups, thiol groups, and combinations thereof; (7) combination thereof.

Examples of preferred silicone-containing vinylic monomers include without limitation N-[tris(trimethylsiloxy)silyl-propyl]-(meth)acrylamide, N-[tris(dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propy)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth) acrylamide monomers of formula (I) are N-[tris(trimethylsiloxy)silylpropyl]acrylamide, TRIS, N-[2-hydroxy-3-(3-(t-butyldimethylsilyl)propyloxy)propyl]acrylamide.

It is understood that a polymeric coating material for the PD base coating can comprise monomeric units of one or more reactive vinylic monomers so as to have multiple reactive functional groups. Exemplary reactive vinylics includes azetidinium-containing vinylic monomers, azlactone-containing vinylic monomers, isocyanate-containing vinylic monomers, epoxy-containing vinylic monomers, and aziridinyl-containing vinylic monomers. Examples of aziridinyl-containing vinylic monomers include without limitation 2-(1-aziridinyl)ethyl(meth)acrylate, 3-(1-aziridinyl) propyl(meth) acrylate, 4-(1-aziridinyl) butyl(meth)acrylate, 6-(1-aziridinyl) hexyl(meth)acrylate, and 8-(1-aziridinyl) octyl (meth)acrylate). Examples of epoxy-containing vinylic monomers include without limitation glycidyl(meth)acrylate, vinyl glycidyl ether, allyl glycidyl ether. Examples of isocyanate-containing vinylic monomers include without limitation 2-isocyanatoethyl(meth)acrylate, 3-isocyanatopropyl(meth)acrylate, 4-isocyanatobutyl(meth)acrylate, 6-isocyanatohexyl(meth)acrylate, 1-methyl-2-isocyanatoethyl methacrylate, and 1,1-dimethyl-2-isocyanatoethyl methacrylate. Examples of azlactone-containing vinylic monomers include without limitation 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers. Azetidinium-containing vinylic monomers can be obtained by reacting epichlorohydrin with a vinylic monomer containing primary or secondary amino groups (any those described above) according to procedures similar to what described in EP1465931 (herein incorporated by reference in its entirety).

Preferably, a polymeric coating material is a polymer or copolymer comprising at least about 70% by mole, preferably at least about 80% by mole, more preferably at least about 90% by mole, even more preferably at least about 95% by mole of monomeric units of one or more carboxyl-containing vinylic monomers, wherein the one or more carboxyl-containing vinylic monomers are selected from the group consisting of acrylic acid, a $C_1$-$C_4$ alkylacrylic acid (e.g., methacrylic acid, ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, and combination thereof. Examples of preferred carboxyl-containing polymeric coating materials include without limitation linear or branched polyacrylic acid; linear or branched polymethacrylic acid; linear or branched poly(acrylic acid-co-acrylamide) having at least about 70% by mole, preferably at least about 80% by mole, more preferably at least about 90% by mole, even more preferably at least about 95% by mole of acrylic acid; linear or branched poly(methacrylic acid-co-acrylamide) having at least about 70% by mole, preferably at least about 80% by mole, more preferably at least about 90% by mole, even more preferably at least about 95% by mole of methacrylic acid; linear or branched poly(acrylic acid-co-vinylpyrrolidone) having at least about 70% by mole, preferably at least about 80% by mole, more preferably at least about 90% by mole, even more preferably at least about 95% by mole of acrylic acid; linear or branched poly(methacrylic acid-co-vinylpyrrolidone) having at least about 70% by mole, preferably at least about 80% by mole, more preferably at least about 90% by mole, even more preferably at least about 95% by mole of methacrylic acid.

More preferably, a polymeric coating material for forming a PD base coating is polyacrylic acid, polymethacrylic acid, poly($C_2$-$C_{12}$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinylpyrrolidone], hydrolyzed poly[(meth)acrylic acid-co-vinylacetate], hydrolyzed poly[$C_2$-$C_{12}$ alkylacrylic acid-co-vinylacetate], polyethyleneimine (PEI), polyallylamine hydrochloride (PAH) homo- or copolymer, polyvinylamine homo- or copolymer, or combinations thereof.

In accordance with the invention, the weight average molecular weight $M_w$ of a polymeric coating material is at least about 50,000 Daltons, more preferably at least about 100,000 Daltons, even more preferably from about 500,000 to 5,000,000 Daltons.

In accordance with the invention, the PD base coating is obtained by contacting the contact lens (preferably silicone hydrogel contact lens) with a solution of a polymeric material. Contacting of a contact lens (preferably silicone hydrogel contact lens) with a coating solution of a polymeric coating material can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution may last up to about 10 minutes, preferably from about 5 to about 360 seconds, more preferably from about 5 to about 250 seconds, even more preferably from about 5 to about 200 seconds.

A solution of a polymeric coating material for forming a PD base coating on contact lenses can be prepared by dissolving one or more polymeric coating material in water, a mixture of water and an organic solvent miscible with water, an organic solvent, or a mixture of one or more organic solvent. Preferably, the polymeric coating material is dissolved in a mixture of water and one or more organic solvents, an organic solvent, or a mixture of one or more organic solvent. It is believed that a solvent system containing at least one organic solvent can swell a silicone hydrogel contact lens so that a portion of the reactive polymer may penetrate into the silicone hydrogel contact lens and increase the durability of the reactive PD base coating.

Any organic solvents can be used in preparation of a solution of the polymeric coating material. Examples of organic solvents include without limitation tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, methanol, ethanol, 1- or 2-propanol, 1- or 2-butanol, tert-butanol, tert-amyl alcohol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methylpyrrolidinone, and mixtures thereof.

In another preferred embodiment, a disposable contact lens (preferably silicone hydrogel contact lens) comprises a plasma base coating on a preformed contact lens and beneath the top coating, wherein the plasma base coating comprises reactive functional groups (any of those described above for the base coating). The plasma base coating is obtained by subjecting the preformed contact lens to a plasma treatment to form a covalently-attached plasma base coating on the contact lens, i.e., polymerizing one or more reactive vinylic monomers (any one of those described previously) under the effect of plasma generated by electric discharge (so-called plasma-induced polymerization). The term "plasma" denotes an ionized gas, e.g. created by electric glow discharge which may be composed of electrons, ions of either polarity, gas atoms and molecules in the ground or any higher state of any form of excitation, as well as of photons. It is often called "low temperature plasma". For a review of plasma polymerization and its uses reference is made to R. Hartmann "Plasma polymerisation: Grundlagen, Technik and Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); 0. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341. Preferably, the plasma-induced polymerization is an "after-glow" plasma-induced polymerization as described in WO98028026 (herein incorporated by reference in its entirety). For "after-glow" plasma polymerization the surface of a contact lens is treated first with a non-polymerizable plasma gas (e.g. H2, He or Ar) and then in a subsequent step the surface thus activated is exposed to a vinylic monomer having an amino group or carboxyl group (any reactive vinylic monomer described above), while the plasma power having been switched off. The activation results in the plasma-induced formation of radicals on the surface which in the subsequent step initiate the polymerization of the vinylic monomer thereon. A plasma base coating is chemically attached to a preformed contact lens.

In accordance with a preferred embodiment of the invention, a top coating is a crosslinked hydrophilic polymeric coating obtained from a water-soluble and crosslinkable hydrophilic polymeric material having (1) dangling hydrophilic polymer chains covalently attached onto the polymeric backbones of the water-soluble and crosslinkable hydrophilic polymeric material through one or more oligo-caprolactone linkages and (2) multiple reactive functional groups capable of reacting with the reactive functional groups of the PD or plasma base coating. The reactive functional groups of a water-soluble and crosslinkable hydrophilic polymeric material can be: carboxyl groups, azetidinium group, amino groups, azlactone groups, isocyanate groups, epoxy groups, aziridine groups, hydroxyl groups, thiol groups, or combinations thereof; preferably carboxyl groups, azetidinium groups, amino groups, azlactone groups, isocyanate groups, epoxy groups, aziridine groups, thiol groups, or combinations thereof; more preferably carboxyl groups, azetidinium group, amino groups, epoxy groups, thiol groups, or combinations thereof; even more preferably azetidinium group, epoxy groups, or combinations thereof, provided that one reactive functional group can react (in a coupling reaction) with one first reactive functional group of the polymeric coating material in the presence or preferably absence of a coupling agent to form a crosslinkage.

In accordance with the invention, the water-soluble and crosslinkable hydrophilic polymeric material preferably comprises, as the reactive functional groups, thermally-crosslinkable groups, more preferably azetidinium groups and/or epoxy groups, even more preferably azetidinium groups. Preferably, the water-soluble and crosslinkable hydrophilic polymeric material is a partially-crosslinked hydrophilic polymeric material that comprises (1) a three-dimensional network, (2) dangling hydrophilic polymer chains each covalently attached onto the network of the water-soluble and crosslinkable hydrophilic polymeric material through one or more oligo-caprolactone linkages, and (3) crosslinkable (preferably thermally-crosslinkable) groups (such as, e.g., azetidinium and/or epoxy groups), more preferably azetidinium groups within the network. The term "partially-crosslinked" in reference to a hydrophilic polymeric material means that the crosslinkable groups of starting materials for making the hydrophilic polymeric material in a crosslinking reaction have not been fully consumed.

In a preferred embodiment, the water-soluble and crosslinkable hydrophilic polymeric material comprises (i) from about 20% to about 95%, preferably from about 35% to about 90%, more preferably from about 50% to about 85%, by weight of first polymer chains derived from an epichlorohydrin-functionalized polyamine or polyamidoamine, (ii) from about 5% to about 80%, preferably from about 10% to about 65%, even more preferably from about 15% to about 50%, by weight of first hydrophilic polymer chains derived from at least one first hydrophilic polymer having up to two (preferably one sole) reactive oligo-caprolactone group (of formula (I) as defined above), wherein the first hydrophilic polymer chains are covalently attached to the first polymer chains through one or more covalent linkages each formed between one azetidinium group and one reactive oligo-caprolactone group of the hydrophilic polymer, and (iii) azetidinium groups which are parts of the first polymer chains or pendant or terminal groups covalently attached to the first polymer chains. The composition of the hydrophilic polymeric material is determined by the composition (based on the total weight of the reactants) of a reactants mixture used for preparing the thermally-crosslinkable hydrophilic polymeric material. For example, if a reactant mixture comprises about 75% by weight of an epichlorohydrin-functionalized polyamine or polyamidoamine and about 25% by weight of at least one first hydrophilic polymer based on the total weight of the reactants, then the resultant hydrophilic polymeric material comprise about 75% by weight of first polymer chains derived from the epichlorohydrin-functionalized polyamine or polyamidoamine and about 25% by weight of first hydrophilic polymer chains derived from said at least one first hydrophilic polymer. The azetidinium groups of the thermally-crosslinkable hydrophilic polymeric material are those azetidinium groups (of the epichlorohydrin-functionalized polyamine or polyamidoamine) which do not participate in crosslinking reactions for preparing the thermally-crosslinkable hydrophilic polymeric material.

An epichlorohydrin-functionalized polyamine or polyamidoamine can be obtained by reacting epichlorohydrin with a polyamine polymer or a polymer containing primary or secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer. Similarly, a homopolymer or copolymer of aminoalkyl(meth)acrylate, mono-alkylaminoalkyl(meth)acrylate, aminoalkyl(meth)acrylamide, or mono-alkylaminoalkyl(meth)acrylamide can also react with epichlorohydrin to form an epichlorohydrin-functionalized polyamine. The reaction conditions for epichlorohydrin-functionalization of a polyamine or polyamidoamine polymer are taught in EP1465931 (herein incorporated by reference in its entirety). A preferred epichlorohydrin-functionalized polymer is polyaminoamide-epichlorohydrin (PAE) (or polyamide-polyamine-epichlorohydrin or polyamide-epichlorohydrin), such as, for example, Kymene® or Polycup® resins (epichlorohydrin-functionalized adipic acid-diethylenetriamine copolymers) from Hercules or Polycup® or Servamine® resins from Servo/Delden.

Any hydrophilic polymer having up to two (preferably one sole) reactive oligo-caprolactone end group (of formula (I) as defined above) can be used as the first hydrophilic polymer for preparing water-soluble crosslinkable hydrophilic polymeric material in the invention. A person skilled in the art will know well to prepare a first hydrophilic polymer having at least one reactive oligo-caprolactone group (of formula (I) as defined above) from a second hydrophilic polymer as a starting material for making the first hydrophilic polymer. For example, a hydrophilic polymer having one or two hydroxyl or carboxyl end groups (as starting material) can be used to initiate ring-opening polymerization of ϵ-caprolactone in the presence of a catalyst (e.g., a stannous octoate catalyst) to form an intermediary hydrophilic polymer terminated at one end or at both ends with an oligo-caprolactone end chain with a hydroxyl end group. The hydroxyl end group of the oligo-caprolactone end chain can be converted into a carboxyl end group by reacting with succinic anhydride. The carboxyl end group can be further converted into an amino end group by reacting with a diamine or a thiol end group by reacting with an amino-containing mercaptan (e.g., 2-aminoethanethiol). Alternatively, an oligo-caprolactone with two carboxyl end groups can be first prepared by first initiating ring opening polymerization of ϵ-caprolactone using a glycolic acid in the presence of a catalyst (e.g., a stannous octoate catalyst) to form α-hydroxyl-ω-carboxyl oligo(ϵ-caprolactone) and then reacting the obtained α-hydroxyl-ω-carboxyl oligo(ϵ-caprolactone) with succinic anhydride. The obtained oligo-caprolactone with two carboxyl end groups can react with a second hydrophilic polymer having one or two end functional group (e.g., amino, carboxyl, isocyanate, or epoxy) according to a coupling reaction in the presence of absence of a coupling agent to form a first hydrophilic polymer having one or two reactive oligo-caprolactone groups of formula (I) (as defined above). Examples also illustrates how to prepare a hydrophilic comprises at least one reactive oligo-caprolactone end group.

In accordance with the invention, a first hydrophilic polymer for making water-soluble crosslinkable hydrophilic polymeric material is a linear or 3-arm (or Y-shape) hydrophilic polymer chain composed of ethyleneoxide units and/or monomeric units derived from at least one hydrophilic vinylic monomer (in a free-radical chain-growth polymerization) selected from the group consisting of N,N-dimethylacrylamide (DMA), N,N-dimethylmethacrylamide (DMMA), 3-acryloylamino-1-propanol, N-methyl-3-methylene-2-pyrrolidone, N-ethyl-3-methylene-2-pyrrolidone, N-methyl-5-methylene-2-pyrrolidone, N-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, dimethylaminoethyl methacrylate (DMAEMA), N-vinyl-2-pyrrolidone (NVP), a $C_1$-$C_4$-alkoxy polyethylene glycol(meth)acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof.

Various monofunctional terminated PEGs can be obtained from commercial sources, e.g., Shearwater Polymers, Inc. and Polymer Sources™. Preferred monofunctional-terminated PEGs are those PEGs with one amino, hydroxyl, acid chloride, or epoxy group at one terminus and a methoxy or ethoxy group at the other terminus. Various monofunctional polyvinylpyrrolidones (PVPs) with one terminal hydroxy, carboxyl or thiol group can be obtained from commercial sources, e.g., Polymer Sources™.

Monofunctional group-terminated linear hydrophilic polymers of one or more hydrophilic vinylic monomers free of any reactive functional group can be prepared according to procedures similar to those described in U.S. Pat. No. 6,218,508, herein incorporated by reference in its entirety. For example, one or more hydrophilic vinylic monomers without functional group (i.e., amino group, hydroxyl group, isocyanate group, carboxyl group, epoxy group, aziridine group, or azlactone group), and a chain transfer agent (e.g., 2-mercaptoethanol, 2-aminoethanethiol, 2-mercaptopropinic acid, thioglycolic acid, thiolactic acid, or other hydroxymercaptanes, aminomercaptans, or carboxyl-containing mercaptanes) are copolymerized (thermally or actinically) in the presence or absence of an initiator to obtain a monohydroxy-, monocarboxyl-, or monoamine-terminated hydrophilic polymer or copolymer. Generally, the molar ratio of chain transfer agent to that of one or more hydrophilic vinylic monomers is from about 1:5 to about 1:100. The molar ratio of chain transfer agent to the hydrophilic vinylic monomer without functional group is selected to obtain a polymer or copolymer with a molecular weight of from about 500 to about 20,000, preferably from about 750 to about 10,000 Daltons. Mono-epoxy-, mono-isocyanate-, or mono-acid chloride-terminated polymers or copolymers of one or more hydrophilic vinylic monomers can be prepared by covalently attaching epoxy, isocyanate, or acid chloride groups to the above-obtained monohydroxy- or monoamine-terminated polymers or copolymers of one or more hydrophilic vinylic monomers according to any known procedures.

Alternatively, monofunctional group-terminated hydrophilic polymers can be prepared by polymerizing the one or more hydrophilic monomers (free of reactive functional group other than ethylenically unsaturated group) in the presence of a hydroxyl-, amine-, or carboxyl-containing free radical initiator at a molar ratio of intiator to the hydrophilic monomers of from about 1:30 to about 1:700. Examples of initiators with amine, hydroxyl, or carboxy group are azo initiators, such as, e.g., 2,2'-Azobis{2-[1-(2-hydroxyethyl)-2-imidazolin-2-yl]propane}dihydrochloride, 2,2'-Azobis{2-methyl-N-[1,1-bis(hydroxymethyl)-2-hydroxyethyl]propionamide, 2,2'-Azobis[2-methyl-N-(2-hydroxyethyl) propionamide], or 2,2'-Azobis {2-methyl-N-[2-(1-hydroxybutyl)]propionamide}, 2,2'-Azobis(2-methylpropionamide)dihydrochloride, 2,2'-Azobis[N-(2-carboxyethyl)-2-methylpropionamidine]tetrahydrate, or the likes.

In accordance with the invention, the three arms of a monofunctional 3-arm hydrophilic polymer independent of each other are a linear hydrophilic polymer chain and they can be identical or different. Each arm is linked to a $C_2$-$C_{20}$ compound having three first reactive functional groups selected from the groups consisting of hydroxyl, amino, carboxyl, isocyanate groups, and combination thereof. A monofunctional 3-arm hydrophilic polymer can be prepared by reacting a first linear hydrophilic polymer having one sole terminal second reactive functional group with a $C_2$-$C_{20}$ compound having three first reactive functional groups to form a mono-di(first functional group) terminated linear hydrophilic polymer; reacting a second linear hydrophilic polymer having one sole third reactive functional group with the mono-di(first functional group) terminated linear hydrophilic polymer to form an intermediary hydrophilic polymer composed of the first and send linear hydrophilic polymers linked by a linkage with one first reactive functional group; and then reacting a third linear hydrophilic polymer having two terminal fourth reactive functional groups with the intermediary hydrophilic polymer to form a 3-arm hydrophilic polymer having one sole terminal fourth reactive functional group. Preferably, a $C_2$-$C_{20}$ compound having three first reactive functional groups for preparing a mono-functional terminated 3-arm hydrophilic polymer comprises three different reactive functional groups having different reactivities, for example, such as, 4-amino-2-hydroxybutanoic acid, 3-amino-2-hydroxypropionic acid, tyrosine, serine, or threonine.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or copolymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

The weight average molecular weight $M_w$ of the hydrophilic polymer having two (preferably one sole) reactive oligo-caprolactone groups is preferably from about 500 to about 1,000,000, more preferably from about 1,000 to about 500,000, even more preferably from about 5,000 to about 250,000 Daltons.

In accordance with the invention, the reaction between a hydrophilic polymer and an epichlorohydrin-functionalized polyamine or polyamidoamine for forming a water-soluble crosslinkable hydrophilic polymeric material is carried out at a temperature of from about 40° C. to about 100° C. for a period of time sufficient (from about 0.3 hour to about 24 hours, preferably from about 1 hour to about 12 hours, even more preferably from about 2 hours to about 8 hours) to form a water-soluble and thermally-crosslinkable hydrophilic polymeric material containing azetidinium groups. In accordance with the invention, the resultant hydrophilic polymeric material must be water-insoluble (i.e., a solubility of less than 0.005 g per 100 ml of water at room temperature) and must not to consume more than about 99%, preferably about 98%, more preferably about 97%, even more preferably about 96% of the azetidinium groups of the epichlorohydrin-functionalized polyamine or polyamidoamine.

In accordance with a preferred embodiment of the invention, crosslinking of a water-soluble and crosslinkable hydrophilic polymeric material onto the PD or plasma base coating is performed preferably by autoclaving a preformed contact lens (preferably silicone hydrogel contact lens) having a PD or plasma coating thereon in a packaging solution (i.e., a buffered aqueous solution) in a sealed lens package at a temperature of from about 118° C. to about 125° C. for approximately 20-90 minutes. In accordance with this embodiment of the invention, the packaging solution is a buffered aqueous solution which is ophthalmically safe after autoclave and comprises the water-soluble crosslinkable hydrophilic polymeric material.

In another preferred embodiment, the top coating is formed according to a process comprising the steps of: contacting at room temperature the preformed contact lens having a PD or plasma base coating thereon with an aqueous solution of the thermally-crosslinkable hydrophilic polymeric material to form a top layer (i.e., an LbL coating) of the thermally-crosslinkable hydrophilic polymeric material on the surface of the contact lens, immersing the contact lens with the top layer of the thermally-crosslinkable hydrophilic polymeric material in a packaging solution in a lens package; sealing the lens package; and autoclaving the lens package with the contact lens therein to form a crosslinked hydrophilic top coating on the contact lens. Because of being positively charged, the thermally-crosslinkable hydrophilic polymeric material is believed to be capable of forming, on a contact lens, an LbL coating which is not covalently bound to the surface of a contact lens (i.e., through physical interactions), especially a contact lens having negatively-charged carboxyl groups on its surface.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (or water-soluble viscosity builders) (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6 to about 8.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris(Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 20 centipoises, preferably from about 1.5 centipoises to about 10 centipoises, more preferably from about 2 centipoises to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble and thermally-crosslinkable hydrophilic polymeric material for forming the top coating.

Where at least one of the crosslinked coating and the packaging solution contains a polymeric material having polyethylene glycol segments, the packaging solution preferably comprises an α-oxo-multi-acid or salt thereof in an amount sufficient to have a reduced susceptibility to oxidation degradation of the polyethylene glycol segments. A commonly-owned co-pending patent application (US patent application publication No. 2004/0116564 A1, incorporated herein in its entirety) discloses that oxo-multi-acid or salt thereof can reduce the susceptibility to oxidative degradation of a PEG-containing polymeric material.

Exemplary α-oxo-multi-acids or biocompatible salts thereof include without limitation citric acid, 2-ketoglutaric acid, or malic acid or biocompatible (preferably ophthalmically compatible) salts thereof. More preferably, an α-oxo-multi-acid is citric or malic acid or biocompatible (preferably ophthalmically compatible) salts thereof (e.g., sodium, potassium, or the like).

In accordance with the invention, the packaging solution can further comprises mucin-like materials (e.g., polyglycolic acid, polylactides, and the likes), ophthalmically beneficial materials (e.g., 2-pyrrolidone-5-carboxylic acid (PCA), glycolic acid, lactic acid, malic acid, tartaric acid, mandelic acid, citric acids, linoleic and gamma linoleic acids, salts thereof, taurine, glycine, and vitamins), and/or surfactants.

Where the disposable contact lens is a silicone hydrogel contact lens, the silicone hydrogel contact lens preferably has at least one of the properties selected from the group consisting of: an oxygen permeability of at least about 40 barrers, preferably at least about 50 barrers, more preferably at least about 60 barrers, even more preferably at least about 70 barrers; an elastic modulus of about 1.5 MPa or less, preferably about 1.2 MPa or less, more preferably about 1.0 or less, even more preferably from about 0.3 MPa to about 1.0 MPa; an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min; a water content of preferably from about 18% to about 70%, more preferably from about 20% to about 60% by weight when fully hydrated; or combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

Example 1

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm³/min., while a nitrogen stream is passed on the opposite side of the lens at a rate of about 10 to 20 cm³/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app}=Jt/(P_{oxygen})$$

where J=oxygen flux [microliters $O_2/cm^2$-minute]

$P_{oxygen}=(P_{measured}-P_{water}$ vapor)=(% $O_2$ in air stream) [mm Hg]=partial pressure of oxygen in the air stream $P_{measured}$=barometric pressure (mm Hg)

$P_{water}$ vapor=0 mm Hg at 34° C. (in a dry cell) (mm Hg)

$P_{water}$ vapor=40 mm Hg at 34° C. (in a wet cell) (mm Hg)

t=average thickness of the lens over the exposed test area (mm)

$Dk_{app}$ is expressed in units of barrers.

The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference lotrafilcon A (Focus® N&D® from CIBA VISION CORPORATION) or lotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of lotrafilcon A or lotrafilcon B (reference) lenses using the same equipment according to the procedure for apparent Dk measurements described above, to obtain the intrinsic Dk value ($Dk_i$) of the reference lens. A thickness series should cover a thickness range of approximately 100 µm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum \left( \frac{t}{Dk_{app}} - \frac{t}{Dk_i} \right)}{n} \quad (1)$$

In which t is the thickness of the test lens (i.e., the reference lens too), and n is the number of the reference lenses measured. Plot the residual oxygen resistance value, $R_r$ vs. t data and fit a curve of the form Y=a+bX where, for the jth lens, $Y_j=(\Delta P/J)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c=t/[(t/Dk_a)-R_r] \quad (2)$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for lotrafilcon A=85 µm. The standard thickness for lotrafilcon B=60 µm.

$$Dk_{a\_std}=t_{std}/[(t_{std}/Dk_c)+R_{r\_std}] \quad (3)$$

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm²/minute.

Lubricity Evaluation

The lubricity rating is a qualitative ranking scheme where 0 is assigned to control lenses coated with polyacrylic acid, 1 is assigned to Oasys™/TruEye™ commercial lenses and 5 is assigned to commercial Air Optix™ lenses. The samples are rinsed with excess DI water for at least three times and then transferred to PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than Air Optix™ lenses, then they are assigned a number 4. For consistency, all ratings are independently collected by the same two operators in order to avoid bias and the data so far reveal very good qualitative agreement and consistency in the evaluation.

Surface Hydrophilicity/Wettability Tests.

Water contact angle on a contact lens is a general measure of the surface hydrophilicity (or wettability) of the contact lens. In particular, a low water contact angle corresponds to more hydrophilic surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-Up Time (WBUT) Tests.

The wettability of the lenses (after autoclave) is also assessed by determining the time required for the water film to start breaking on the lens surface. Briefly, lenses are removed from the vial and washed 3 times in ~200 ml of fresh DI water in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from DI water and are assigned a WBUT of 0 seconds. Lenses exhibiting WBUT≥5 seconds are considered wettable and are expected to exhibit adequate wettability (ability to support the tear film) on-eye.

Example 2

Preparation of Chain-Extended Polydimethylsiloxane Vinylic Macromer with Terminal Methacrylate Groups (CE-PDMS Macromer)

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum (2×10⁻² mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

Example 3

Preparation of Lens Formulations

A lens formulation is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-distearoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Preparation of Lenses

Lenses are prepared by cast-molding from the lens formulation prepared above in a reusable mold, similar to the mold shown in FIGS. 1-6 in U.S. Pat. Nos. 7,384,590 and 7,387,759 (FIGS. 1-6). The mold comprises a female mold half made of CaF₂ and a male mold half made of PMMA. The UV irradiation source is a Hamamatsu lamp with the WG335+TM297 cut off filter at an intensity of about 4 mW/cm². The lens formulation in the mold is irradiated with UV irradiation for about 25 seconds. Cast-molded lenses are extracted with iso-propanol (or methyl ethyl ketone, MEK), rinsed in water, coated with polyacrylic acid (PAA) by dipping lenses in a propanol solution of PAA (0.1% by weight, acidified with formic acid to about pH 2.5), and hydrated in water. Resultant lenses having a reactive PAA-LbL base coating thereon are determined to have the following properties: ion permeability of about 8.0 to about 9.0 relative to Alsacon lens material; apparent Dk (single point) of about 90 to 100; a water content of about 30% to about 33%; and an elastic modulus of about 0.60 MPa to about 0.65 MPa.

Example 4

Preparation of Caprolactone-Poly(Ethylene Glycol) Methyl Ether [Polymer A]

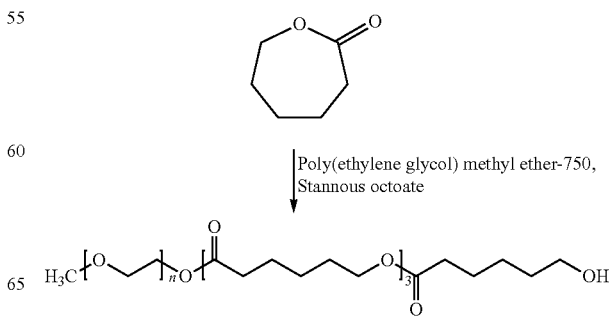

A solution of caprolactone (30.43 grams, 266.60 mmoles), poly(ethylene glycol) methyl ether (M.W.750Da) (50 grams, 66.66 mmoles) and 10% stannous octoate in toluene (1.3 grams) is heated under stirring in Nitrogen atmosphere at 135° C. and maintained overnight. The reaction mixture is cooled to room temperature, dissolved in Chloroform (200 ml), treated with carbon black, dried over sodium sulphate, filtered through a pad of Celite and distilled under vacuum to get mono-caprolactone-terminated poly(ethylene glycol) methyl ether (75 grams) as pale yellow syrup. In addition, 25 grams of the above polymer is dissolved in Chloroform (125 ml), washed with water (2×10 ml), dried over Sodium sulphate, filtered and distilled to get Polymer A (12.5 grams) as pale yellow syrup.

Amino Terminated Caprolactone-Poly(Ethylene Glycol) Methyl Ether [Polymer B]

Step 1

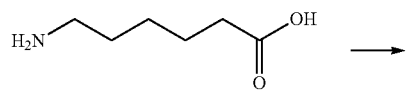

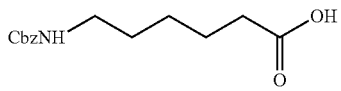

Cbz stands for Benzyloxycarbonyl amino protecting group

To a solution of 6-Amino hexanoic acid (50 grams, 379.65 mmol) in 1N Sodium hydroxide (95.3 ml) is cooled to 5 to 10° C. and simultaneously added from two separating funnels 4N Sodium hydroxide (190.6 ml) and Benzyl chloroformate (50% in Toluene, 196 grams) keeping the temperature at 5 to 10° C., later stirred at the same temperature for 2 hours and allowed to room temperature and stirred overnight. The reaction mixture is washed with Diisopropyl ether (3×200 ml), cooled to 10° C.; pH adjusted to 2 with dilute HCl, residue precipitated is filtered, dried and slurried in Diisopropyl ether to give pure 6-Benzyloxycarbonylamino hexanoic acid (38 grams) as white powder.

Step 2

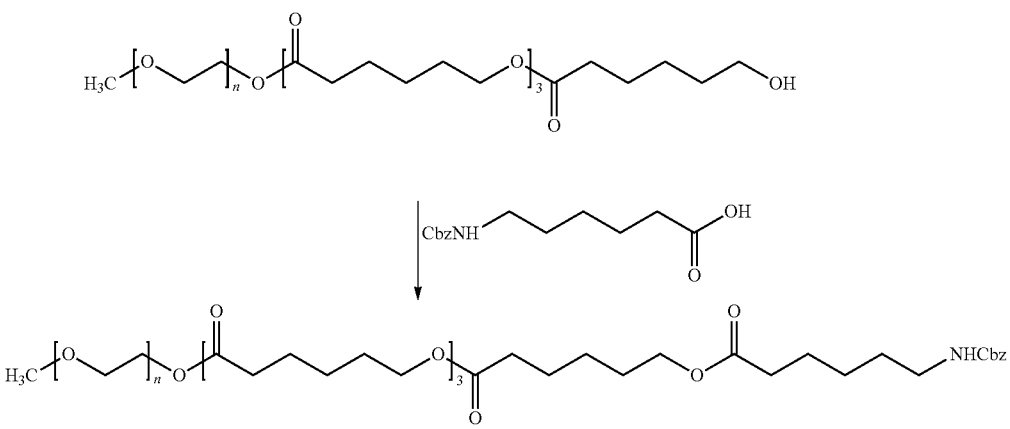

To a solution of Polymer A (50 grams), 6-Benzyloxycarbonylamino hexanoic acid (8.6 grams, 32.30 mmol) and 1-hydroxy benzotriazole (1.36 grams, 10.05 mmol) in dry tetrahydrofuran (THF) (400 ml) at 0 to 5° C. is added a solution of Dicyclohexylcarbodiimide (11.65 grams, 56.46 mmol) in THF (25 ml) drop wise under nitrogen blanket. The reaction mixture was stirred overnight at room temperature.

The reaction mixture is filtered to remove the dicyclohexylurea salts, washed with THF, dried over Sodium sulphate, filtered, distilled off the solvent under vacuum to get the crude, which is purified by column chromatography on silica gel using Hexane:Ethyl acetate (8:2) to get Cbz-Amino hexanoic acid polymer A as light brown syrup.

Step 3

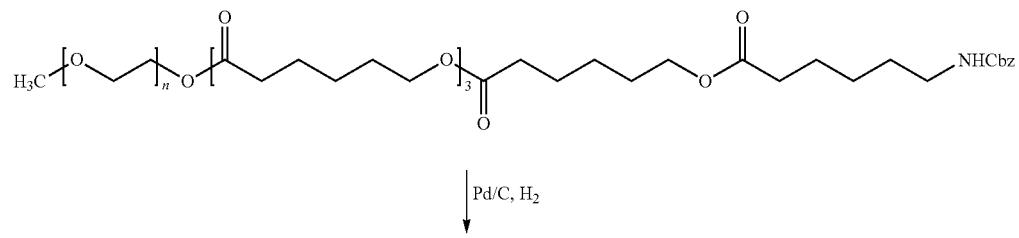

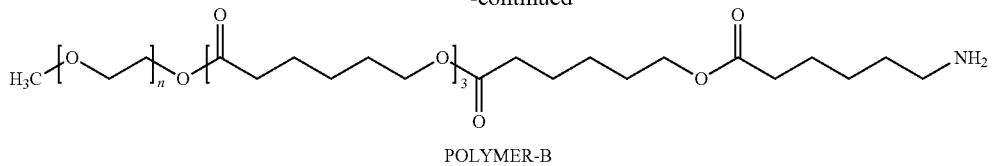

POLYMER-B

Cbz-Amino hexanoic acid polymer A (5 grams) is dissolved in Methanol (50 ml) in a Pressure vessel, 10% Palladium on carbon (1 gram, 50% wet) added and the mixture stirred under an atmosphere of Hydrogen (5 Kg) for 36 hours at 50° C. The catalyst is removed by filtration, the solvent distilled off under reduced pressure to get Polymer B (Amino hexanoic acid polymer A, 2 grams) as off white syrup.

Characterization of Resultant Polymers

Proton NMR analysis of the polymers dissolved in $CDCl_3$ shows evidence for the presence of the different protons expected based on the structure of the polymers. Infrared analysis of the polymers between 600 to 4000 $cm^{-1}$, shows evidence for the presence of the caprolactone and PEG units in the polymers. In addition, an intense signal at 3430 $cm^{-1}$ for Polymer B suggests a salt form of the amine groups present in the final polymer B.

A series of titration curves are collected for the two polymers to determine the presence of primary amines in polymer B. The polymers are dissolved in DI water as 1 wt % solution. The pH of 10 ml of this solution is brought to ~3 by the addition of 0.1N HCl. Then the pH of this solution is measured as 0.1N NaOH is added to this solution in increments of 50 µl. As a control, 10 ml of DI water is also included in the titration curves. The results clearly show the presence of a buffering action for Polymer B compared to Polymer A. This is most likely due to the presence of primary amines in Polymer B and further suggests the final synthesized polymers contains all the targeted functional groups.

What is claimed is:

1. A disposable contact lens, comprising:
a preformed silicone hydrogel contact lens composed of a silicone hydrogel material; and a top lubricious hydrophilic coating thereon, wherein the top lubricious hydrophilic coating is made from a hydrophilic polymeric material including dangling hydrophilic polymer chains covalently linked to the hydrophilic polymeric material through up to two oligo-caprolactone linkages susceptible to cleavage by enzymes present in tear fluid, wherein the oligo-caprolactone linkages independent of one another are a divalent radical of

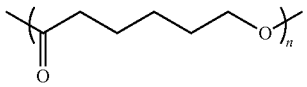

in which n is an integer of 12 or less, wherein the disposable contact lens is characterized by having a controlled, wearing-induced deterioration in surface hydrophilicity and/or lubricity over a replacement schedule period.

2. The disposable contact lens of claim 1, wherein the preformed contact lens has at least one of the properties selected from the group consisting of: an oxygen permeability of at least about 40 barriers; an elastic modulus of about 1.5 MPa or less; an Ionoflux Diffusion Coefficient, D, of at least about $1.5 \times 10.6$ mm2/min; a water content of from about 18% to about 70% when fully hydrated; or combinations thereof.

3. The disposable contact lens of claim 2, further comprising a physically-deposited (PD) base coating on top of the preformed contact lens but beneath the top lubricious hydrophilic coating, wherein the top lubricious hydrophilic coating is covalently attached onto the PD base coating, wherein the PD base coating comprises a polymeric coating material including reactive functional groups and affinity groups, wherein the reactive functional groups are selected from the group consisting of carboxyl groups (i.e., —COOH), azetidinium group, amino groups (i.e., primary and/or secondary amino groups), azlactone groups, isocyanate groups, epoxy groups, aziridine groups, thiol groups, hydroxyl groups, and combinations thereof, wherein the affinity groups are either identical to or different from the reactive functional groups and are selected from the group consisting of carboxyl groups, ammonium groups (i.e., acidified primary, secondary or tertiary amino groups), hydrophobic moieties (e.g., C8-C20 alkyl groups), hydrophobic segments (e.g., tris(trialkylsilyloxy)silyl, di(trialkylsilyloxy)silyl, polydimethylsiloxane, polypropylene oxide, polybutylene oxide), and combinations thereof.

4. The disposable contact lens of claim 3, wherein the polymeric coating material for forming the PD base coating is: (1) a homopolymer of an ammonium-containing vinylic monomer or a caboxyl-containing vinylic monomer; (2) a copolymer of one or more ammonium-containing and/or carboxyl-containing vinylic monomers; (3) a copolymer of one or more ammonium containing and/or carboxyl-containing vinylic monomers with a vinylic monomer selected from the group consisting of (meth)acrylamide, N,N-dimethyl (meth)acrylamide, N-vinylpyrrolidone (NVP), N,N-dimethylaminoethyl (meth)acrylate, N,N-dimethylaminopropyl (meth)acrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, C1-C4-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (which is a hydrolyzed form of vinyl acetate in the copolymer), a phosphorylcholine-containing vinylic monomer, and combinations thereof and optionally with one or more reactive vinylic monomer having a reactive functional group selected from the group consisting of azetidinium group, azlactone groups, isocyanate groups, epoxy groups, aziridine groups, and combinations thereof; (4) polyethyleneimine (PEI); (5) polyvinylalcohol with pendant primary and/or secondary amino groups; (6) block copolymers including at least one hydrophobic segments and polymeric segments having reactive functional groups selected from the group consisting of azetidinium group, azlactone groups, isocyanate groups, epoxy groups, aziridine groups, thiol groups, and combinations thereof; (7) combination thereof.

5. The disposable contact lens of claim 4, wherein the polymeric coating material for forming the PD base coating is a polymer or copolymer comprising at least about 70% by mole of monomeric units of one or more carboxyl-containing vinylic monomers, wherein the one or more carboxyl-containing vinylic monomers are selected from the group consisting of acrylic acid, a C1-C4 alkylacrylic acid (e.g., methacrylic acid, ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxyl-4-phenyl butadiene-1,3, itaconic acid, citraconic acid, mesaconic acid, glutaconic acid, aconitic acid, maleic acid, fumaric acid, and combination thereof.

6. The disposable contact lens of claim 4, wherein the polymeric coating material for forming a PD base coating is polyacrylic acid, polymethacrylic acid, poly(C2-C12 alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinylpyrrolidone], hydrolyzed poly[(meth)acrylic acid-co-vinylacetate], hydrolyzed poly[$C_2$-$C_{12}$ alkylacrylic acid-co-vinylacetate], polyethyleneimine (PEI), polyallylamine hydrochloride (PAH) homo- or copolymer, polyvinylamine homo- or copolymer, or combinations thereof.

7. The disposable contact lens of claim 4, wherein the weight average molecular weight Mw of the polymeric coating material for forming the PD base coating is at least about 50,000 Daltons.

8. The disposable contact lens of claim 1, further comprising a plasma base coating on the preformed contact lens and beneath the top lubricious hydrophilic coating, wherein the plasma base coating comprises reactive functional groups selected from the group consisting of carboxyl groups (i.e., —COOH), amino groups (i.e., primary and/or secondary amino groups), azlactone groups, isocyanate groups, epoxy groups, aziridine groups, hydroxyl groups, and combinations thereof.

9. The disposable contact lens of claim 1, wherein the top lubricious hydrophilic coating is a crosslinked hydrophilic polymeric coating obtained from a water-soluble and crosslinkable hydrophilic polymeric material having: (1) dangling hydrophilic polymer chains covalently attached onto the polymeric backbones of the water-soluble and crosslinkable hydrophilic polymeric material through up to two oligo-caprolactone linkages; and (2) multiple reactive functional groups capable of reacting with the reactive functional groups of the PD or plasma base coating, wherein the reactive functional groups of a water-soluble and crosslinkable hydrophilic polymeric material can be: carboxyl groups, azetidinium group, amino groups, azlactone groups, isocyanate groups, epoxy groups, aziridine groups, hydroxyl groups, or combinations thereof; provided that one reactive functional group can react (in a coupling reaction) with one reactive functional group of the polymeric coating material in the presence or absence of a coupling agent to form a crosslinkage.

10. The disposable contact lens of claim 9, wherein the water-soluble and crosslinkable hydrophilic polymeric material is a partially-crosslinked hydrophilic polymeric material that comprises (1) a three-dimensional network, (2) dangling hydrophilic polymer chains each covalently attached onto the network of the water-soluble and crosslinkable hydrophilic polymeric material through up to two oligo-caprolactone linkages, and (3) crosslinkable groups within the network.

11. The disposable contact lens of claim 9, wherein the water-soluble and crosslinkable hydrophilic polymeric material comprises:

(i) from about 20% to about 95% by weight of first polymer chains derived from an epichlorohydrin-functionalized polyamine or polyamidoamine;

(ii) from about 5% to about 80% by weight of first hydrophilic polymer chains each derived from at least one first hydrophilic polymer having up to two reactive oligo-caprolactone group of formula (I)

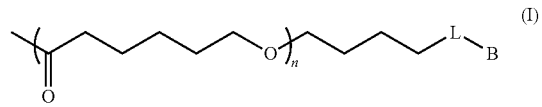

in which "n" is an integer of 12 or less, L is a direct bond or a divalent radical having up to 24 carbon atoms and optionally containing up to two linkages selected from the group consisting of —C(O)—, —O—, —NR'—(R' as defined above), —S—, or combination thereof, and B is amino group (—NHR' as defined above) or carboxyl group or thiol group, wherein the first hydrophilic polymer chains are covalently attached to the first polymer chains through one or more covalent linkages each formed between one azetitdinium group and one reactive oligo-caprolactone group of the hydrophilic polymer; and (iii) azetidinium groups which are parts of the first polymer chains or pendant or terminal groups covalently attached to the first polymer chains.

12. The disposable contact lens of claim 11, wherein the first hydrophilic polymer for making the water-soluble crosslinkable hydrophilic polymeric material is a linear or 3-arm (or Y-shape) hydrophilic polymer chain composed of ethyleneoxide units and/or monomeric units derived from at least one hydrophilic vinylic monomer (in a free-radical chain-growth polymerization) selected from the group consisting of N,N-dimethylacrylamide (DMA), N,N-dimethylmethacrylamide (DMMA), 3-acryloylamino-1-propanol, N-methyl-3-methylene-2-pyrrolidone, N-ethyl-3-methylene-2-pyrrolidone, N-methyl-5-methylene-2-pyrrolidone, N-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, dimethylaminoethyl methacrylate (DMAEMA), N-vinyl-2-pyrrolidone (NVP), a C1-C4-alkoxy polyethylene glycol (meth)acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof.

13. The disposable contact lens of claim 11, wherein the first hydrophilic polymer for making the water-soluble crosslinkable hydrophilic polymeric material comprises one sole reactive oligo-caprolactone group of formula (I).

14. The disposable contact lens of claim 11, wherein the weight average molecular weight Mw of the first hydrophilic polymer is from about 500 to about 1,000,000.

\* \* \* \* \*